Nov. 1, 1966

E. GRETEN 3,282,767

METHOD AND APPARATUS FOR THE PRODUCTION
OF PARTICLE BOARD PANELS

Filed April 16, 1962

INVENTOR.
ERNST GRETEN

ATTORNEYS

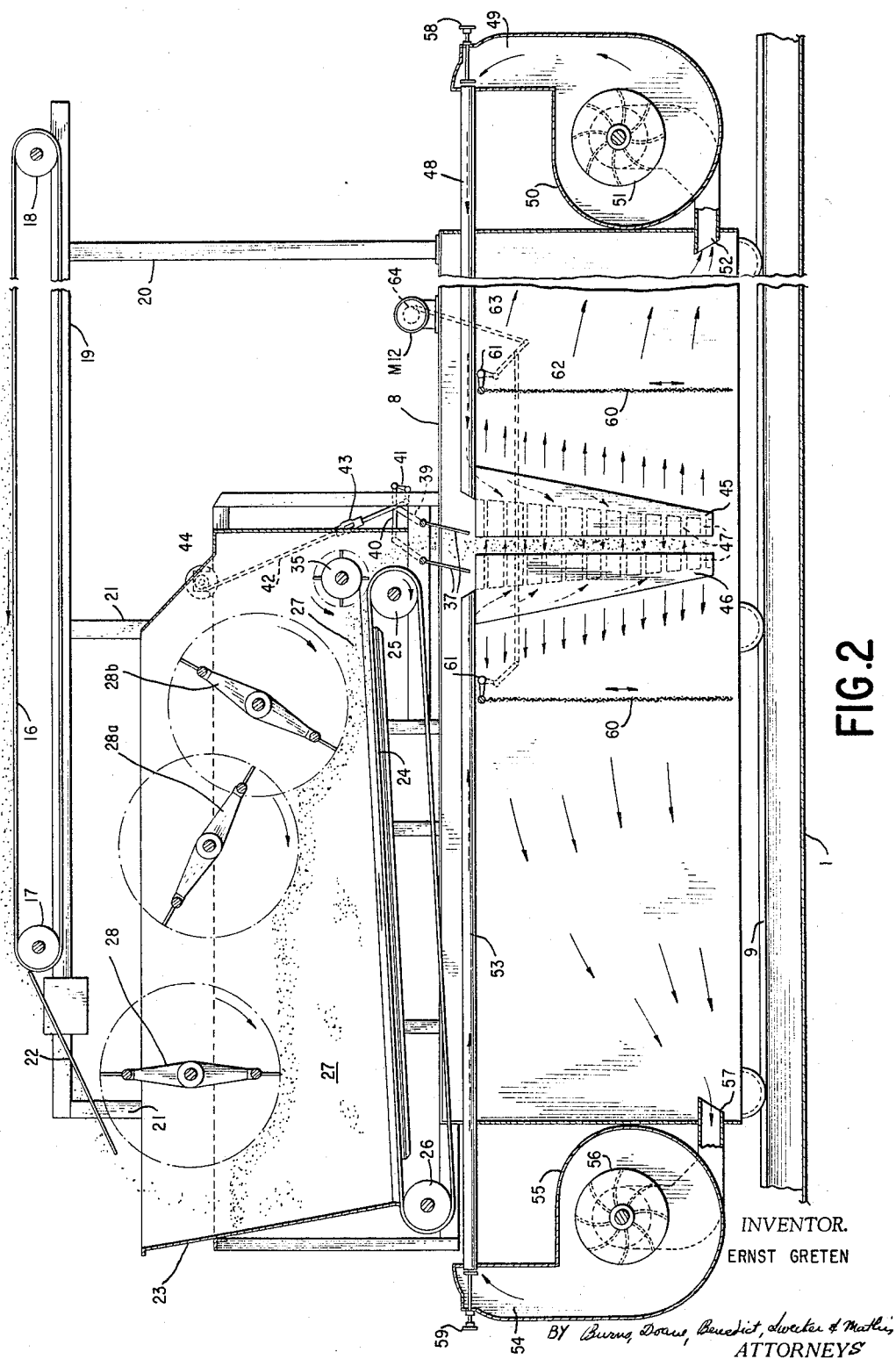

Nov. 1, 1966  E. GRETEN  3,282,767
METHOD AND APPARATUS FOR THE PRODUCTION
OF PARTICLE BOARD PANELS
Filed April 16, 1962  9 Sheets-Sheet 5
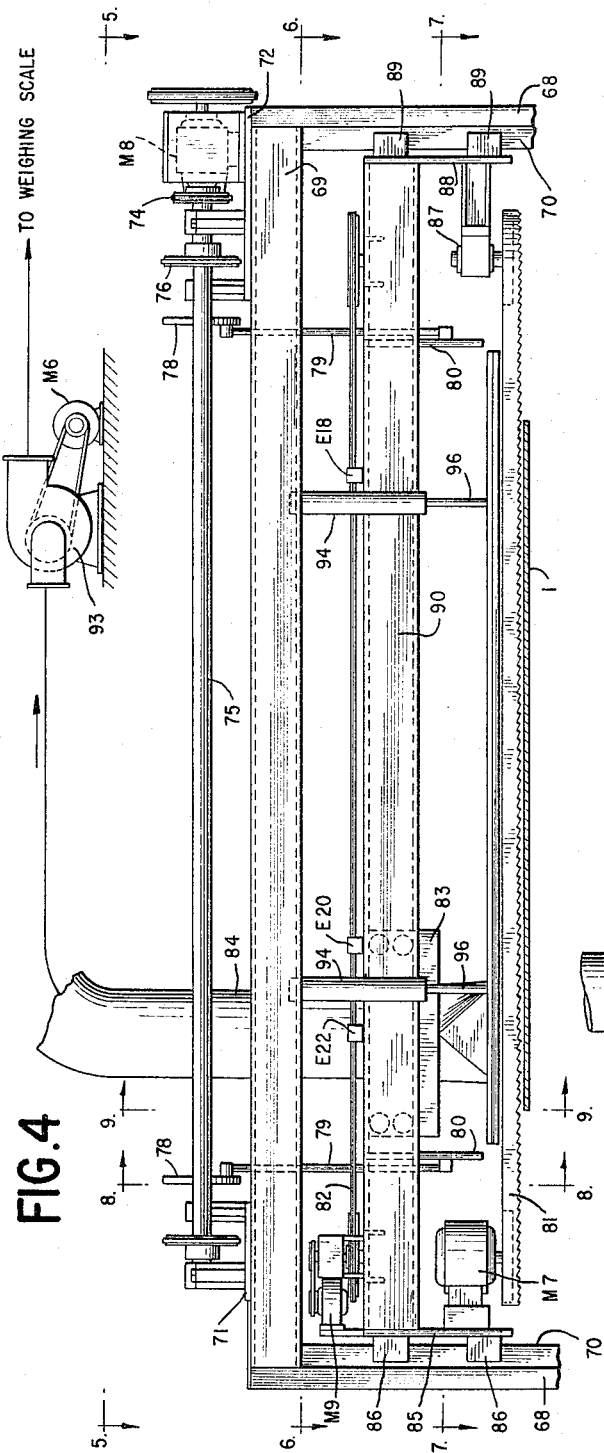
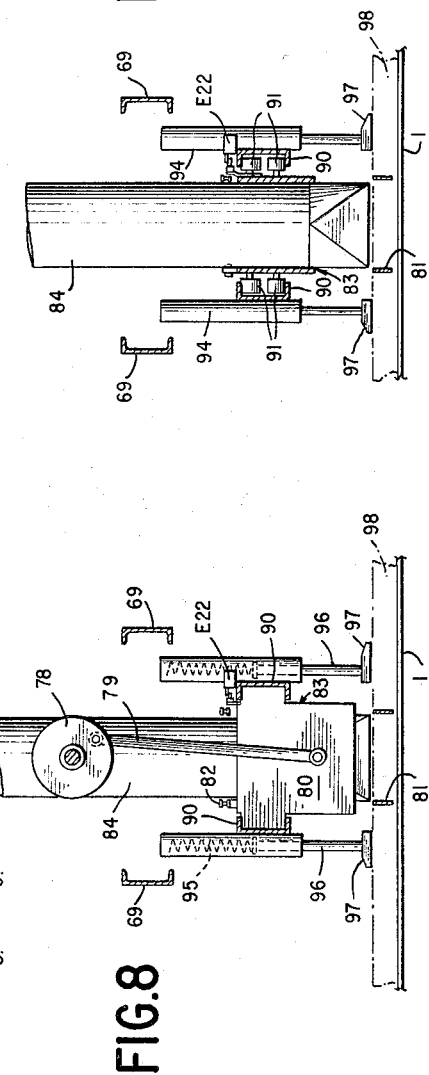
INVENTOR.
ERNST GRETEN
BY
ATTORNEYS

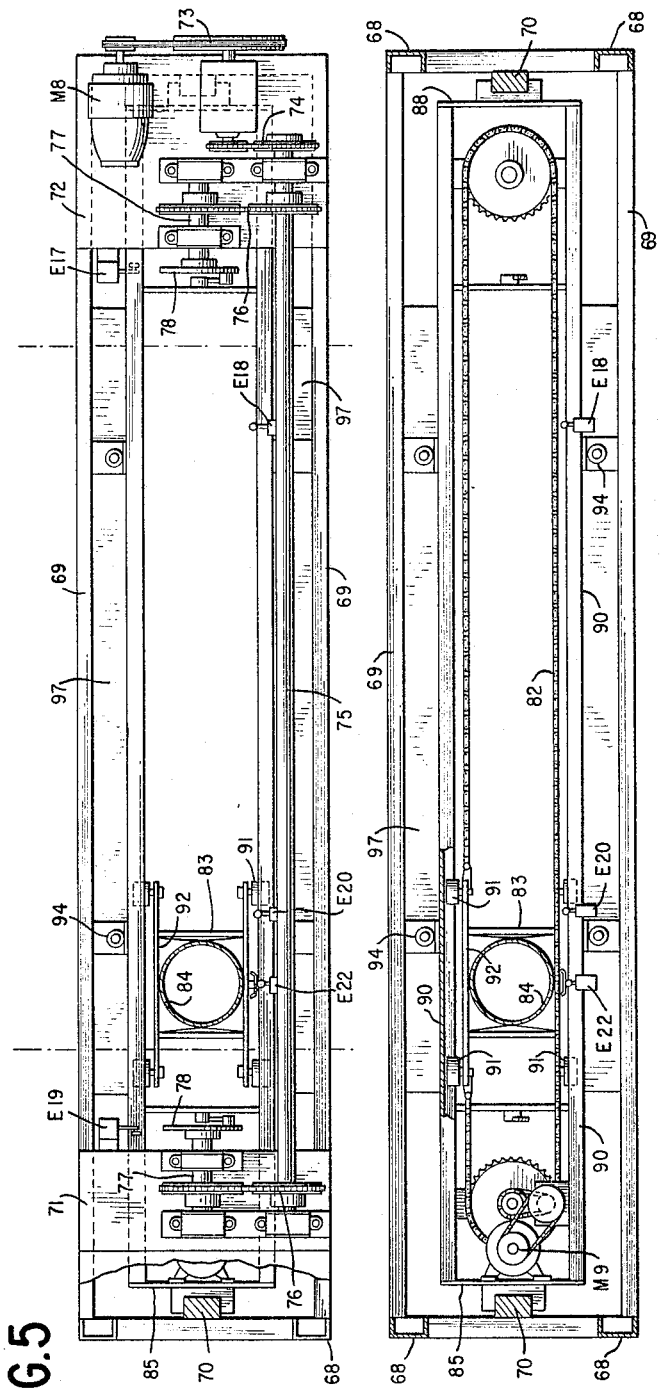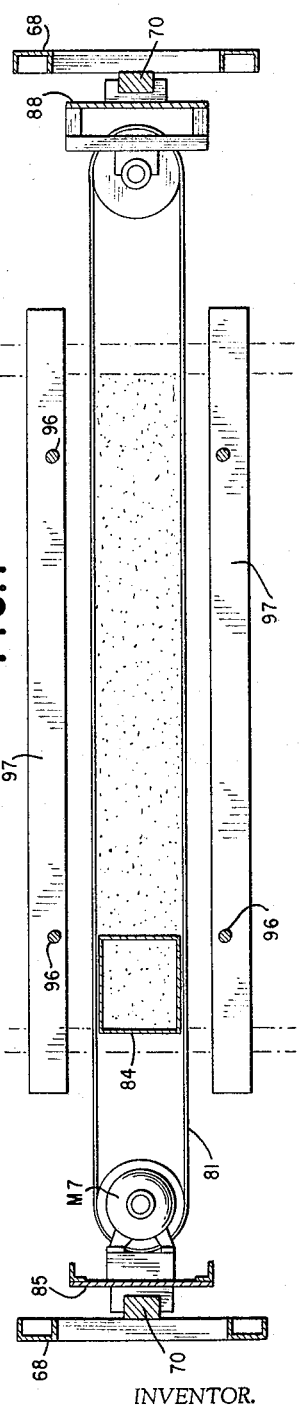

Nov. 1, 1966    E. GRETEN    3,282,767
METHOD AND APPARATUS FOR THE PRODUCTION
OF PARTICLE BOARD PANELS
Filed April 16, 1962    9 Sheets-Sheet 7

INVENTOR.
ERNST GRETEN
BY
ATTORNEYS

United States Patent Office 3,282,767
Patented Nov. 1, 1966

3,282,767
METHOD AND APPARATUS FOR THE PRODUCTION OF PARTICLE BOARD PANELS
Ernst Greten, Springe, Hannover, Germany, assignor to Metallwerk Bahre K.G., Springe, Hannover, Germany, a firm of Germany
Filed Apr. 16, 1962, Ser. No. 187,469
9 Claims. (Cl. 156—373)

This application is a continuation-in-part of my United States application Serial No. 822,500, filed June 24, 1959, now Patent No. 3,038,527.

This invention relates to an improved method and apparatus for the production of particle board panels from loose, discrete particles from source material comprised of a heterogeneous mixture of various size particles. The invention particularly contemplates the production of particle board panels from a single supply of a heterogeneous mixture of particles of varying size from coarse to fine characterized in that in the finished panel there is a gradual gradation of particle size from the center of the panel to each face thereof, such that the coarsest particles lie in the center of the panel and successively finer particles are positioned in the direction of each face thereof, with the finest particles forming the opposed faces of the panel.

The present invention is exemplified in relation to what may be termed a single layer press installation.

It is the purpose and object of the invention to provide an improved method and apparatus for producing particle board panels in a single press installation of great uniformity in character and under the control of a single operator.

It is a more specific object of the invention to provide an improved method and apparatus for forming particle board panels through the medium of mechanical instrumentalities embracing an intermittently operated mat-carrying conveyor, an intermittently actuated press, an intermittently operated mat-severing instrumentality and an intermittently operated distribution chamber for air laying successive mat sections directly on the mat-carrying conveyor.

It is a further object of the invention to provide a correlated time sequence of operation of the single layer press, the mat-severing instrumentality and the distribution chamber for laying successive mat sections in relationship to the step-by-step advance of the mat-carrying conveyor, such that each succeeding panel is produced under uniform and accurately controlled conditions.

While the distribution chamber for air laying successive mat sections on a mat-carrying conveyor is exemplified in relation to a single layer press installation, it is to be understood that it is within the purview of the invention to employ the subcombination in the form of the particle distribution chamber and its associated mechanism in other environments than the specifically exemplified installation.

With respect to the subcombination comprising the particle distribution chamber and associated elements, it is a subordinate specific object of the invention to provide such a subcombination embracing a novel form of plenum chamber in association with means for drawing air under particle impelling force in opposite directions to act upon heterogeneous admixed particles supplied to the distribution chamber.

It is still among the more specific objects of the invention to provide for the shifting of the zone of admission of heterogeneous admixed particles to the distribution chamber with respect to the plenum chamber to and from which impelling air for the particles is circulated.

It is a further detailed object of the invention to insure against the carrying of lightweight, large surface particles to areas near the opposite ends of the distribution chamber to insure that such large surface particles will be positioned beneath the respective faces of the finished panel.

Further and additionally, it is a more specific object of the invention to provide in association with the instrumentality for severing successive mat sections preliminary to the pressing thereof, means for removing a sample from the air laid mat incident to the control of the composition of succeeding mat sections.

Further and additional objects of the invention will become apparent as the description proceeds, which will be given in connection with the accompanying drawings forming a part hereof, and in which:

FIGURES 1A and 1B, together, constitute a side elevation of a complete intermittently operated, single layer press installation suitable for carrying out the invention.

FIGURE 2 is an enlarged view and side elevation with parts broken away, illustrating the particle distribution chamber and associated mechanism.

FIGURE 4 is a detailed fragmentary view of the mat-severing instrumentality taken in the direction of the arrows 4—4 of FIGURE 1B.

FIGURE 5 is a plan view with parts broken away, taken in the direction of the arrows 5—5 of FIGURE 4.

FIGURE 6 is a transverse view, partly in section, taken on line 6—6 of FIGURE 4.

FIGURE 7 is a further transverse view, partly in section, taken along the lines 7—7 of FIGURE 4.

FIGURE 8 is a detailed fragmentary view taken along line 8—8 of FIGURE 4.

FIGURE 9 is a somewhat similar detailed fragmentary view taken along line 9—9 of FIGURE 4.

Figure 12A:
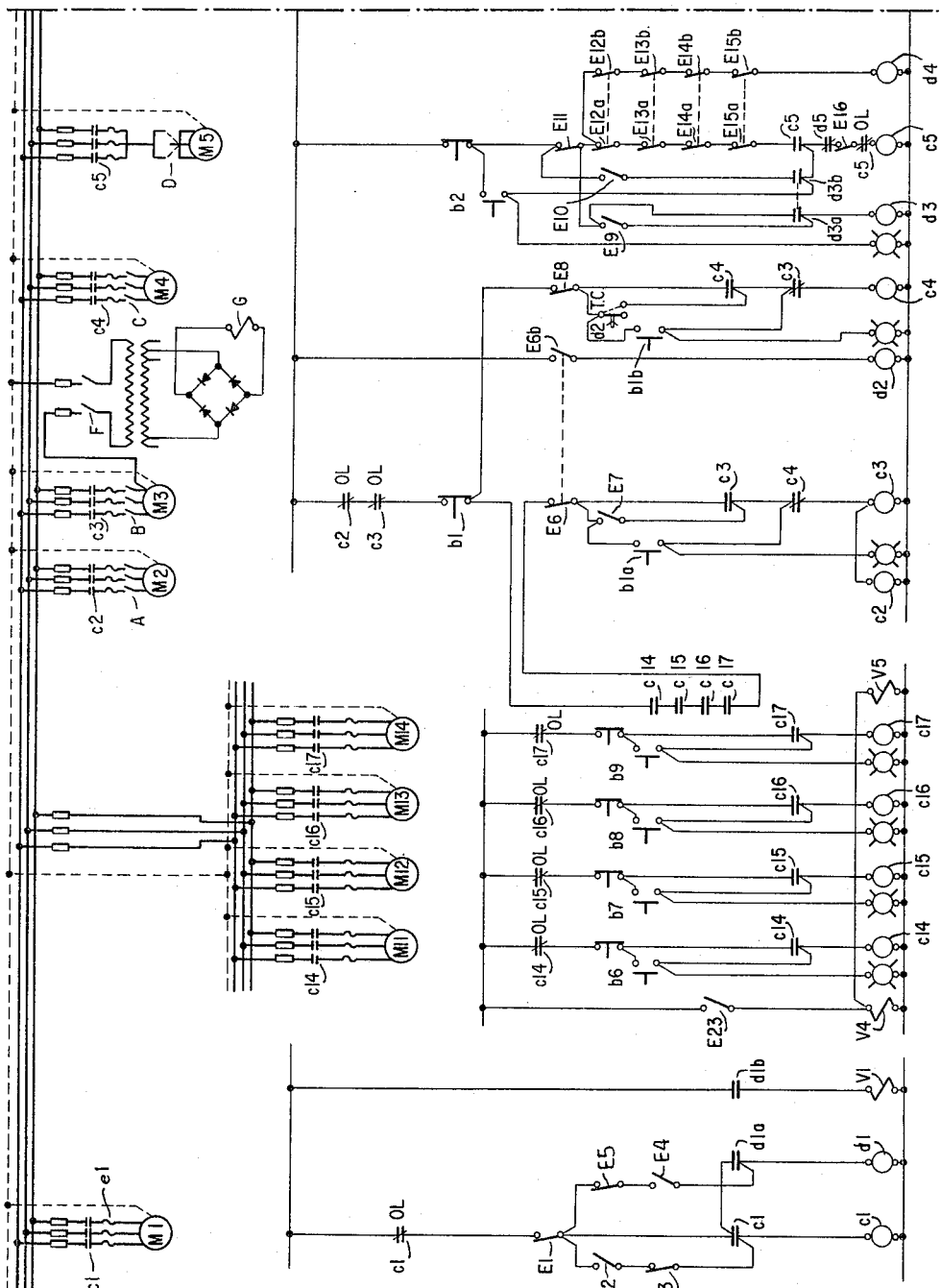
Figure 12B:
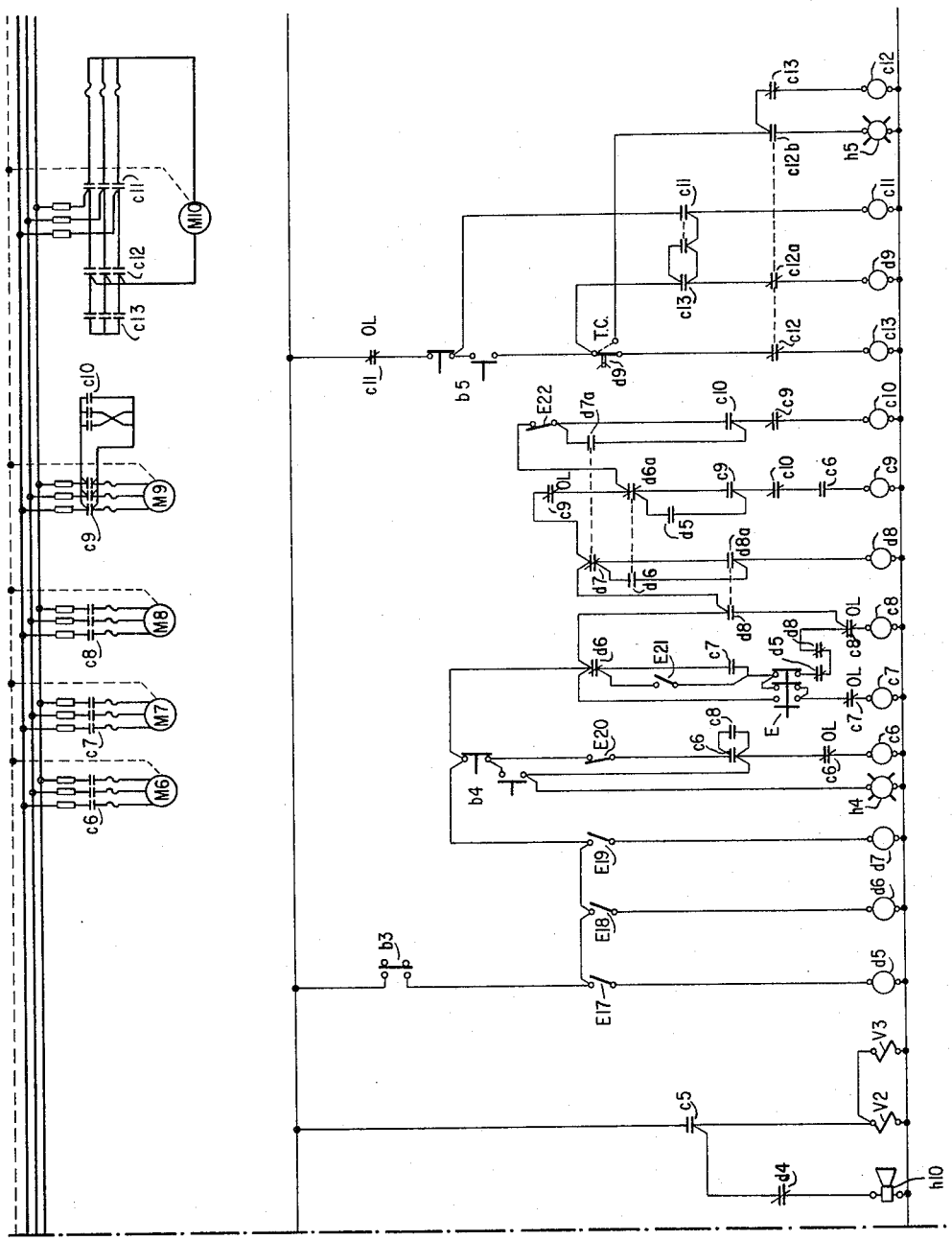

FIGURES 12A and 12B disclose diagrammatic circuit layouts for the actuation and control of the multiple motors and instrumentalities embodied in the exemplified form of the invention.

Figure 1A:
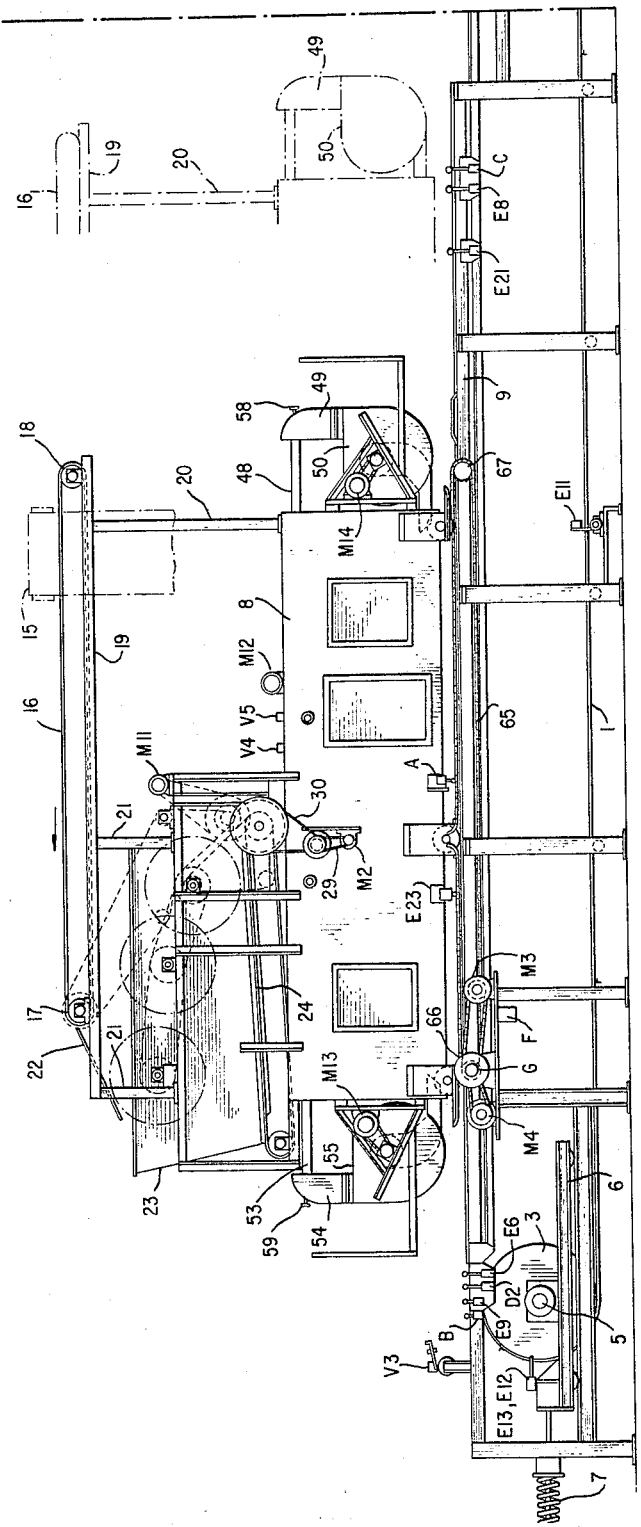
Figure 1B:
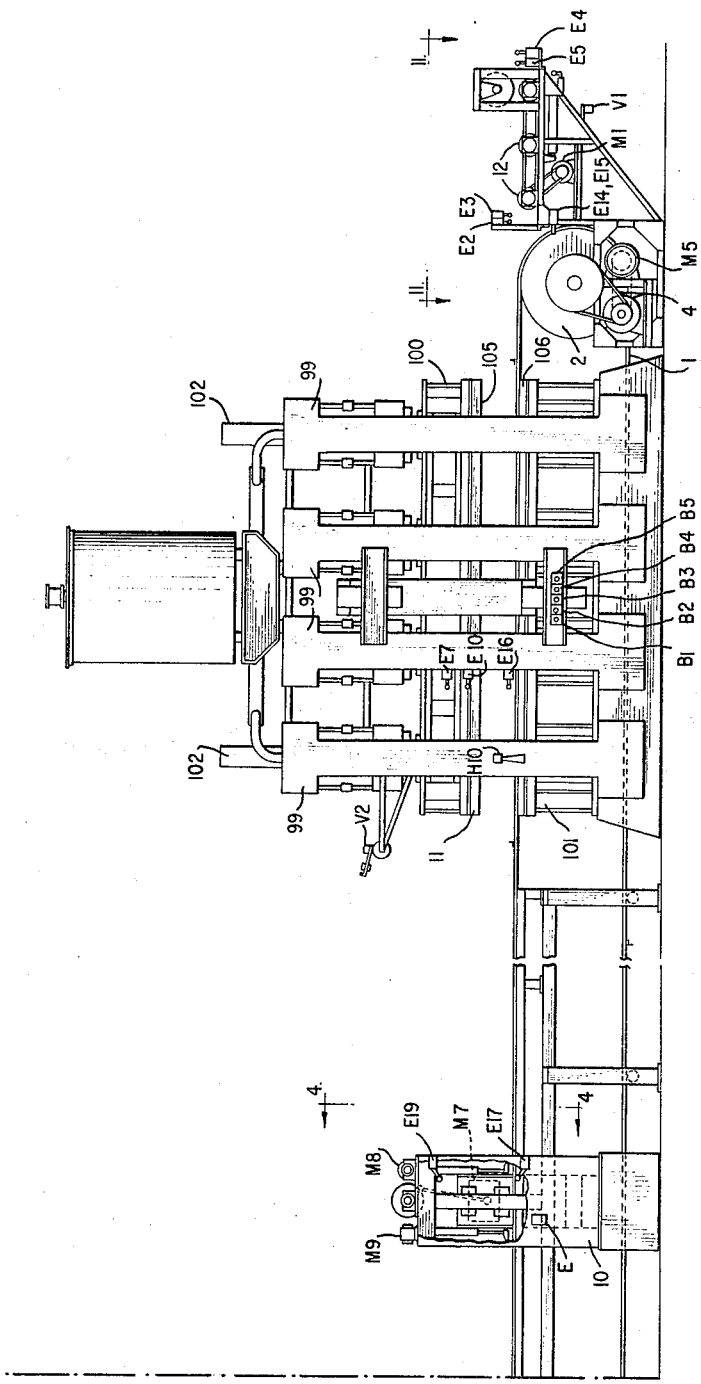

Referring to FIGURES 1A and 1B, the continuous conveyor 1 is trained about the driven drum 2 at the right-hand end of FIGURE 1B and the idler drum 3 at the left-hand end of FIGURE 1A. The top run of conveyor 1 is intermittently advanced toward the right a predetermined distance roughly corresponding to the length of a desired panel by means of the motor M5 and the intermediate belt drive 4 to driven drum 2. The bearings 5 for the idler drum 3 are mounted on a carriage 6 which is biased toward the left by a set of springs 7 (FIGURE 10) which function to maintain tension on and prevent slack in the conveyor 1. The particle distribution chamber designated generally at 8 is movable to and fro along the conveyor 1 on a track 9. The mat-severing instrumentality 10 is suitably located in a fixed position in relationship to the single opening press 11.

Figure 11:
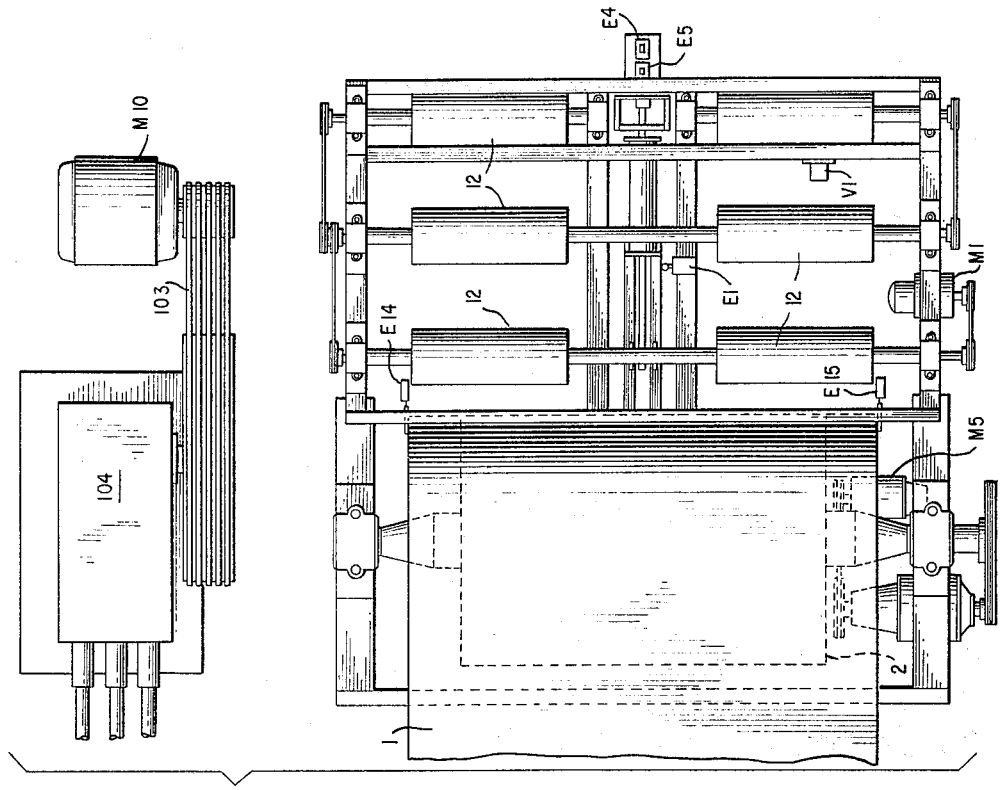
FIGURE 11 is a fragmentary plan view in the direction of the arrows 11—11 looking down on the portion of the installation at the extreme left of FIGURE 1B.

It will be appreciated that no cauls for supporting individual mat sections need be employed inasmuch as the particle distributing chamber 8 is effective to lay an uncompressed mat of loose discrete particles directly on the surface of the top run of the conveyor 1, the mat severing instrumentality 10 is also adapted to sever a mat section of predetermined length that is directly carried by the conveyor 1 and the single opening press 11 is effective to compress the pre-laid mat of loose discrete particles to produce either a cured or self-sustaining panel. The compressed panels leaving the single opening press 11 are moved from the delivery end of the conveyor 1 onto the surfaces of a series of high speed rollers 12 (FIG. 11) driven by motor M1. The speed of the rollers 12 is such that a compressed panel is moved from the conveyor 1 at an accelerated rate. The mat-receiving surface of the conveyor 1 may be appropriately cleansed and conditioned as it moves upwardly about the idler drum 3 through the medium of a series of spray nozzles 13 connected to a header 14 controlled at V3.

Returning to the particle distributing chamber 8 and its associated elements, reference is made to FIGURES 1A, 2, 2A and 3. The heterogeneous admixture of particles of varying sizes from exceedingly coarse to fine is delivered by an elevator indicated in dotted lines at 15 in FIGURE 1A to the continuous feed belt 16 on driven drum 17 and idler drum 18 which are carried on a frame member 19 supported from distribution chamber 8 by members 20 and 21 so that the feed belt 16 partakes of longitudinal movement with distributing chamber 8. The feed belt 16 delivers admixed particles from its left-hand end over a baffle 22 from which the admixed particles fall vertically into the bin 23 positioned above a second continuous upwardly inclined feed belt 24 trained about driven drum 25 and idler drum 26. The feed belt 24 functions to carry the admixed particles designated 27 toward the right hand or delivery end of the bin 23. Mounted transversely of the bin 23 is a series of rotary paddles 28, 28a and 28b, each of which rotates in a clockwise direction and acts to toss successive portions of the particles 27 to the left and away from the delivery end of bin 23. The rotary paddles 28, 28a and 28b are mounted on axes positioned in successively lower transverse planes. It will be understood that the rotary paddles 28, 28a and 28b are suitably positioned to ensure that the depth of the bed of particles 27 at the delivery end of the bin 23 will be appropriate for introduction to the distributing chamber 8.

Figure 2A:
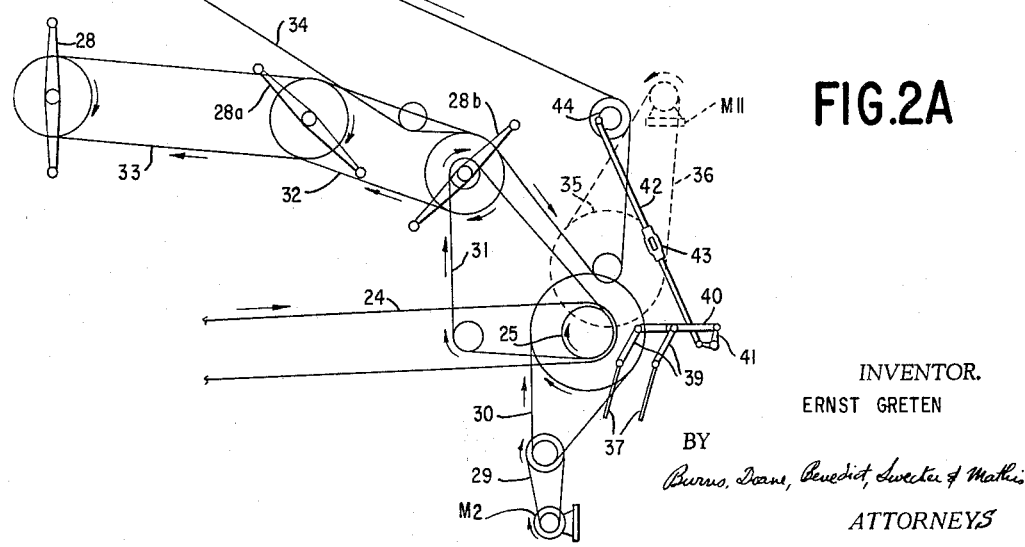
FIGURE 2A is a diagrammatic view illustrating the driving setup for the instrumentalities effective to feed admixed particles to the distribution chamber.

By reference to FIGURE 2A, it will be observed that the feed belt 16, the inclined feed belt 24, the rotary paddles 28, 28a and 28b are all driven by motor M2 through a series of belt drives and suitable differential pulleys embracing the belts 29, 30, 31, 32, 33 and 34 which move in the directions of the arrows applied in FIGURE 2A.

The inclined feed belt 24 at its delivery end advances the heterogeneous mixture of particles into the path of the impeller blades carried by the drum 35 which is independently driven at a suitably controlled speed by motor M11 and belt 36 as indicated in dotted lines in FIGURE 2. The impeller drum 35 together with the feed belt 24 cooperate to ensure an even and constant feed of particles 27 to the distribution chamber 8 and prevent the dropping of compacted chunks of particles. A further feature of the particle feeding means embraces a complemental pair of spaced oscillatable baffles 37 mounted on axes 38 and actuated through bars 39, linkage 40, bell crank 41, link 42, in which is positioned an adjustable turn buckle 43, through eccentric 44 which takes its power from belt 34 (FIG. 2A). The baffles 37 are during a mat-laying operation oscillated at a fairly high speed, such as fifty oscillations per minute for example, to ensure the feed of particles to the distribution chamber 8 in a manner that will provide for uniform distribution therein.

The particles supplied by the belt 24 and the impeller drum 35 during the mat-laying operation are supplied at a continuous uniform rate to fall between the oscillating baffles 37 and be delivered in the form of a loose curtain extending transversely of the distributing chamber 8 at the approximate longitudinal center thereof.

Figure 3:
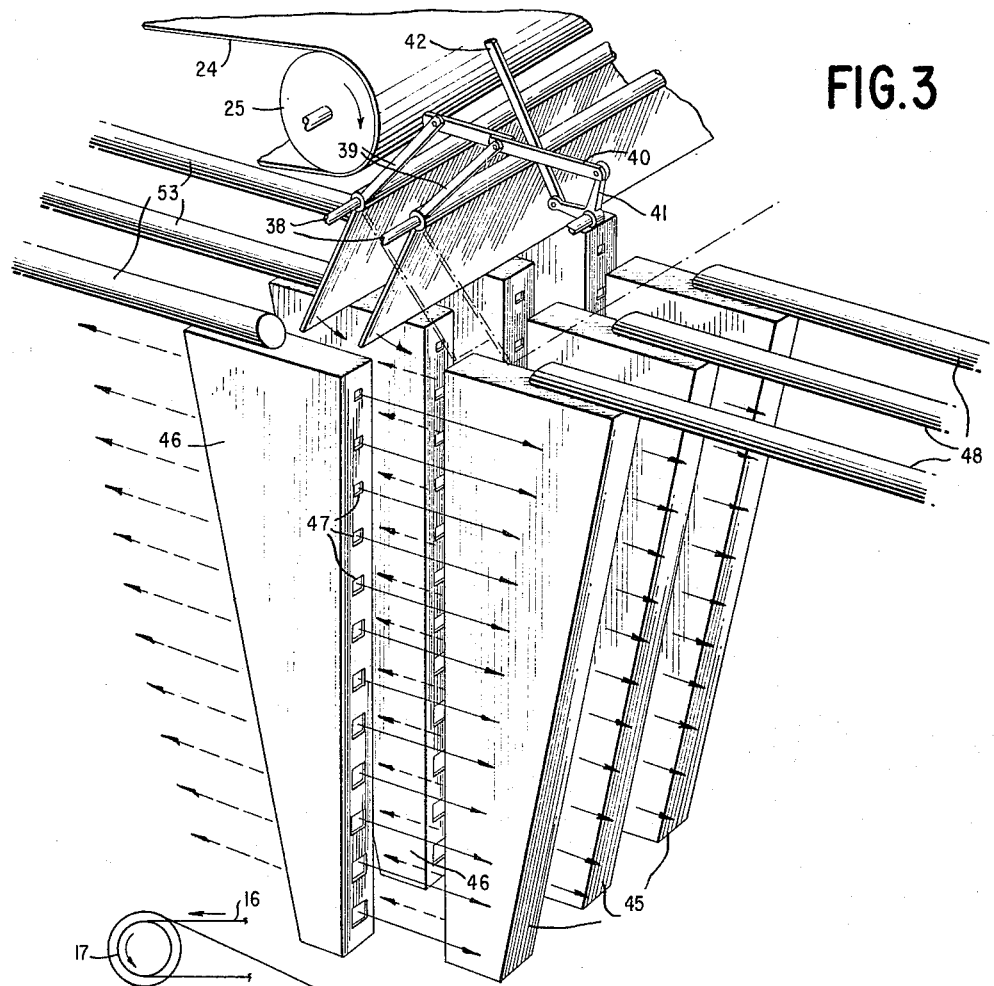
FIGURE 3 is a detailed perspective view illustrating elements which, together, form the plenum chamber in relationship to the air circulating conduits and the particle supply means.

Within the distributing chamber 8 there is provided a plenum chamber or zone comprised of parallel transverse rows of spaced apart air-receiving chambers. The air-receiving chambers of the right-hand row are designated 45 and the air-receiving chambers of the left-hand row are designated 46, as seen in FIGURE 3. The lateral spacing between chambers 45 and the transverse spacing between the chambers 46 is somewhat greater than the transverse dimension of chambers 45 and 46. Additionally, chambers 45 are so disposed that their vertical faces are directly opposed to the spaces between chambers 46 while chambers 46 are disposed so that their vertical faces are opposed to the spaces between chambers 45. The chambers 45 and 46 are appropriately suspended from the top wall of distribution chamber 8. The vertical face of each chamber 45 and 46 is provided with a series of air outlet openings 47 which are progressively larger from the tops of chambers 45 and 46 toward the bottoms thereof. Air supply pipes 48 are arranged to receive circulating air from a header 49 associated with the housing 50 for the blower fan 51 which draws air through conduit 52 from the right-hand end of distribution chamber 8.

A set of pipes 53 similar to pipes 48 connect the tops of chambers 46 with a header 54 associated with the housing 55 for the blower 56 which draws air through conduit 57 from the left-hand end of distribution chamber 8. Sets of valves 58 and 59 are provided for individually throttling the air pipes 48 and 53, respectively. The blower 51 in housing 50 is effective to draw air under a particle impelling force through the openings 47 in the vertical faces of the transverse row of spaced depending chambers 46 to pass through the spaces intermediate of the transverse row of chambers 45 and impel particles toward the right-hand end of distribution chamber 8. The blower 56 on the other hand draws air through the openings 47 in the vertical faces of the transverse row of spaced chambers 45 to pass through the spaces intermediate chambers 46 and impelled particles toward the left-hand end of distribution chamber 8. The air withdrawn by blower 51 through conduit 52 is through the medium of header 49 and pipes 48 recirculated to the tops of the transverse row of spaced chambers 45 whereas the air withdrawn by blower 56 through conduit 57 through the medium of header 54 and pipes 53 is recirculated to the tops of the transverse row of spaced chambers 46.

It will thus be seen that the air recirculated by blower 51 from the right-hand end of the distribution chamber 8 is drawn under a particle impelling force from the row of chambers 45 by blower 56 to thereby impel particles to the left of distribution chamber 8 and that air recirculated by blower 56 from the left-hand end of chamber 8 is drawn under particle impelling force through the openings 47 in the vertical faces of chambers 46 by blower 51 to impel particles toward the right-hand end of distribution chamber 8. As above pointed out to the end that there will be no channeling of particles fed to the plenum zone or chamber which might result in uneven distribution through delivery of more particles to one end of the distribution chamber 8 than to the other, the oscillation of baffles 37, whose axes 38 are positioned equal distance from a plane extending vertically and centrally of the space intermediate the vertical faces of the rows of chambers 45 and 46, ensures even distribution of particles in both ends of distribution chamber 8.

With some raw materials from which particles are produced, it has been found that some very lightweight particles have undesirably large surfaces. When such large surface lightweight particles are impelled to the opposite extremities of distribution chamber 8, they appear on the opposed faces of the final particle board panel destroying the homogeneity and appearance thereof. In order to ensure that any lightweight large surface particles will be confined to intermediate portions of the panel, there is provided a pair of vertically vibrated screens 60 carried by rocker shafts 61 which are oscillated by linkage 62 to impart an essentially vertical component of movement to the screens 60. The linkage 62 is driven by the rod 63 from eccentric 64 which takes power from motor M12, the speed of which is so controlled as to effect rapid vertical movement of the screens 60 which may be of the order of 70–80 cycles per minute. The screens 60 interrupt only lightweight particles of unwanted large surface which due to the shaking action of the screens 60 are caused to drop on the mat being laid at points intermediate the bottom and top faces of the mat.

In the exemplified single layer press installation, the entire sub-assembly carried by the distribution chamber 8 including the feed belts 16, 24, bin 23 and all associated elements partake of the same to and fro movement along track 9 and mat carrying conveyor 1 as does the distribution chamber 8. By reference to FIGURE 1A, it will be observed that the blower 51 in housing 50 is driven by motor M14 and the blower 56 in housing 55 by the motor M13 both of which are carried by the distribution chamber 8.

In the exemplified installation, a mat section is laid by the distribution chamber 8 only during the period that said chamber and its associated instrumentalities move toward the left as shown in FIGURE 1A. Such movement of the distribution chamber 8 is effected by a continuous belt 65 trained over a driven drum 66 and an idler drum 67. When the chamber 8 is moving toward the left, the belt 65 is driven at a controlled rate of speed by the variable speed motor M3 through a suitable belt drive to drum 66. On the return trip, during which chamber 8 is inoperative to lay a mat section, the belt 65 is driven at higher speed by motor M4 through a suitable drive to drum 66. When the distribution chamber 8 and associated instrumentalities are moving to the right in FIGURE 1A, motor M2 and all the instrumentalities' driving power therefrom including the feed belts 16 and 24 are at rest. It is a matter of indifference as to whether motors M11, M12, M13 and M14 are operating during the return travel of distribution chamber 8 to the right in FIGURE 1A and they are normally permitted to continue in operation.

Occasionally, there may be some unwanted accumulation of particles, for example, beneath the belt 24 or at other points in the distribution chamber and associated elements. To facilitate keeping the apparatus free from any unwanted accumulation, there is maintained a source of compressed air under the control of solenoid valves V4 and V5 from which the air is led by conduits to admit cleaning jets of air at desired points.

On each leftwise journey of distribution chamber 8, there is completed the laying of a portion of the mat carried by conveyor 1 to the full desired thickness of the loose uncompressed mat and also there is laid toward the extreme left hand end of movement of chamber 8 a partial mat section diminishing in thickness and in particle size toward the left hand end thereof. The rate of diminishing thickness of this last formed partial mat section is exceedingly gradual. For example, the thickness of the partial mat section diminishes no more than about 3 inches for 10 feet of longitudinal length whereby all particles lie essentially flat in the loose laid mat. On the next cycle of movement, the last laid partial mat section formed on the previous cycle has been advanced by the conveyor 1 to a point where it is completed by the particles impelled to the right in distribution chamber 8 as it again advances to the left. Detailed controls and sequences will be pointed out in later references to the diagrammatic circuit layouts of FIGURES 12A and 12B.

Coming next to the instrumentality 10 for severing successive mat sections of predetermined length for delivery to the single layer press, reference will be made to FIGURES 4 through 9 inclusive. The instrumentality 10 embraces a frame having vertical legs 68 rigidly interconnected by transverse bars 69. A vertical track 70 is carried intermediate legs 68 at each end of the frame. Plates 71 and 72 extend across the top of the frame and bridge transverse bars 69. Motor M8 is supported on plate 72 and through appropriate intermediate belt means 73 and 74 drives shaft 75 which in turn through belts 76 drives stub shafts 77 each carrying at its inner end an eccentric 78 coupled by pitman bars 79 (FIGURE 4) to depending brackets 80 which support a sub-assembly carrying the motors M7 and M9 which respectively drive the endless band saw 81 and the endless belt 82 effective to move the carriage 83 and the associated vacuum suction tube 84 in a direction transversely of the mat carrying conveyor 1. The motors M7 and M9 are mounted on a vertical plate 85 having channel members 86 to ride on associated vertical track 70. The idler pulley 87 for the band saw 81 is carried on a vertical plate 88 having channel members 89 which are complemental to channel members 86 and ride on associated vertical track 70. Vertical plates 85 and 88 are interconnected by innerfacing channel members 90 (FIGURE 6), the innerfacing channels of which provide tracks for rollers 91 on side members 92 of carriage 83 supporting the lower end of the suction pipe 84. The carriage 83 is operatively connected to the endless belt 82 driven by motor M9 and the arrangement is such that when the saw 81 makes parallel cuts in the loose mat on the conveyor 1, the suction pipe 84 flexibly connected to vacuum pump 93 will be advanced with carriage 83 transversely of the conveyor 1 and the short section of the loose mat particles between the runs of band saw 81 will be sucked up from the conveyor 1 and carried via the vacuum pump 93 to a suitable weighing instrumentality as a control sample effective to regulate the supply of particles for subsequent mat sections (see FIGURE 4).

By reference to FIGURE 8, the detailed construction and operation of the eccentrics 78, pitman bars 79 in relation to members 80 will be readily appreciated. It will also be noted that the channel bars 90 each carry a pair of laterally spaced cylinders 94, each housing a spring 95 acting against an associated plunger 96, each pair of plungers 96 carrying a pressure bar 97 and these pressure bars are brought into engagement with the upper face of the loose mat 98 to hold and stabilize the same during the severing thereof by saw 81 and the taking of the sample through suction pipe 84.

The precise sequence of operation of the several motors M7, M8 and M9 in relationship to the actuation of the mat-carrying conveyor 1 will be set forth in relation to the diagrammatic circuit layouts of FIGURES 12A and 12B.

Figure 10:
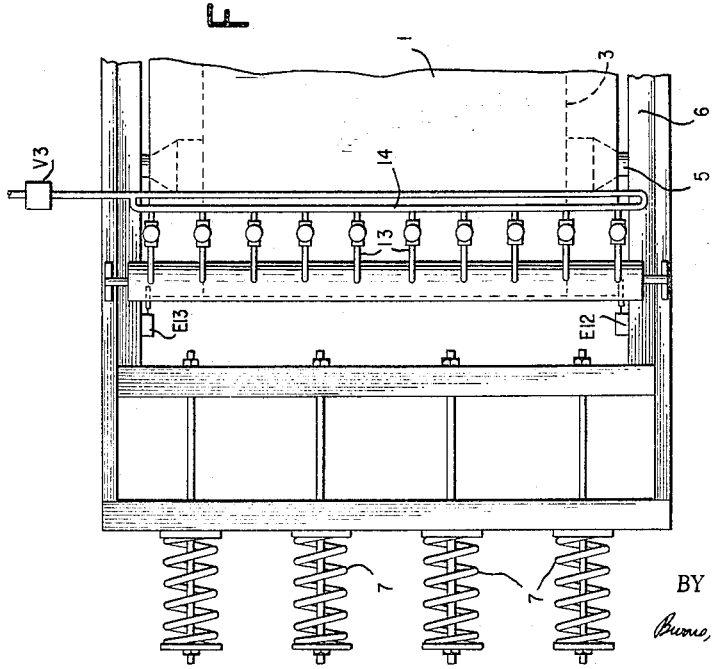
FIGURE 10 is a fragmentary plan view looking down on a portion of the installation at the extreme left of FIGURE 1A.

When the single layer press 11 is opened, the mat-carrying conveyor 1 advances to move the next succeeding loose, uncompressed mat section into the press. As the conveyor 1 advances toward the right in FIGURE 1B, a set of nozzles complemental to the nozzles 13 shown in FIGURE 10 are actuated under the control of a solenoid valve V2, to spray water, which may contain some added agent such as a silicone releasing agent, on the upper surface of the air laid mat section as it moves into the press 11. It is feasible to employ the spray nozzles 13 at the left-hand end of the conveyor 1 to provide excess moisture throughout the area of the bottom face of succeeding air laid mat sections and to employ similar nozzles under the control of valve V2 to provide excess moisture throughout the top face of the air laid mat so that the heated platens of the press 11 will, during the pressing of the mat section to form a panel, drive steam from the upper and lower faces of the mat under compression toward the center of the mat to facilitate uniform heating and compressing of the particles throughout the cross-section of the compressed panel.

The press 11, with minor exceptions, is a more or less conventional hydraulic press. It embraces four main frames 99, each extending transversely of the mat-carrying conveyor 1 and each carrying two transversely spaced hydraulically operated pistons for moving the press head 100 downwardly onto a loose mat section and toward the press base 101. The opening of the press is effected by hydraulic pistons operating in the end cylinders 102. The motor M10 (FIGURE 11), through appropriate V-belt drive 103, supplies power to the double-acting hydraulic pump 104 to provide the hydraulic fluid under controls appropriate to the requirements of the press 11.

The press head 100 is so constructed that it may receive removable platens of varying thickness, such as the platen 105. Likewise, the platen 106 on the press base 101 is removable and may be exchanged for a platen of different thickness. By selecting platens of suitable thickness, the density of the compressed panel can be controlled without varying the extent of movement of the press head 100. The sequence of operation of the press head 100 and associated instrumentalities in relation to the actuation of the mat-carrying conveyor 1 will be further set forth in relation to the diagrammatic circuit layouts of FIGURES 12A and 12B, as well as the operation of auxiliary instrumentalities such as those for preventing disalignment of the mat-carrying conveyor 1 and controls over delivery of compressed panels from conveyor 1.

In the interest of clarity the numerous motors, switches, solenoid valves and control elements bear the same reference characters throughout the drawings, including the circuit diagrams of FIGURES 12A and 12B.

Motor M1 shown in FIGURE 12A at the upper left portion of the diagram drives the delivery rolls at the right of the structure shown in FIGURE 1B. This motor is powered from a circuit including fuses $e1$ and relay contacts $c1$.

As shown in FIGURE 12A, the upper circuit bus leads to relay $c1$ through a normally closed set of overload contacts $c1$ OL. Energization of relay coil $c1$ is dependent upon closure of switch E1. This switch is closed at all times except when pneumatic cylinder 107 is at the extreme outward position in its stroke. Consequently, under normal conditions relay $c1$ can be energized by closure of switch E2 when a panel is delivered from the press to the proximity of the roller conveyor. Closure of switch E2 energizes relay coil $c1$ through switch E3 which is still closed, and the relay locks in on its contact $c1$. As the panel next encounters switch E3, this switch opens, but relay $c1$ remains self energized. The leading edge of the panel next encounters switch E5 which it opens. Motor M1 remains running and the roller conveyor continues to transport the panel which holds switch E5 open but shortly after opening E5 the panel has closed switch E4. Therefore, when the trailing edge of the panel goes past E5 this switch closes while the panel is still retaining switch E4 in a closed condition, to energize control relay $b1$ which locks itself in over contacts $b1$ and simultaneously closes adjacent contacts $b1$ which energizes solenoid valve V1 to supply air to pneumatic cylinder 107. As this cylinder advances its piston to push the finished panel away from the machine to the loading station at the end of the stroke switch E1 is opened which de-energizes relays $c1$ and $b1$. Consequently, motor M1 stops and the solenoid valve V1 resumes a closed condition. A mechanical spring returns the piston to its normal position in the cylinder 107 and switch E1 closes so that the circuit is ready for the subsequent operation under control switches E2 through E5.

The mat forming distributor employs 4 motors which are operated continuously during production, as well as other power sources to be later described which are programmed in a definite time sequence. These motors are shown with the control circuitry in FIGURE 12A to the left of the diagram. Motor M11 feeds the particles delivered by belt 24 by rotating the impellor drum 35 and is controlled by contacts of relay C14. Relay coil C14 is controlled by a pair of manually operated momentarily closable switches $b6$, closure of which locks the relay coil in by contacts C14 as a result of closure of the manual switch shown to the left the circuit. As is usual and shown in the circuit diagram overload contact switches are provided in this specific instance indicated at C14 OL.

Similar circuitry is shown for operating relay coil C15 to initiate operation of motor M12 for vibrating the screens 60. Also, identical circuitry is provided relays 16 and 17 for energizing fan motors M13 and M14 at either end of the distributing chamber 8. Provided that motors M11, M12, M13 and M14 are in operation, auxiliary contacts C14, C15, C16 and C17 are closed by the relays to permit longitudinal movement of the distributing chamber 8 along the track 9 overlying the mat carrying conveyor 1 to carry out sequential mat forming operations.

The operation of the necssary control circuitry for moving the distributing chamber 8 will be described below, but it should be here pointed out that the chamber 8 is normally adjacent the mat severing means 10 in a rest condition, aside from the motors just described as constantly running, and carries out a mat forming operation in its traverse from right to left in FIGURE 1A. When the position most remote from means 10 has been reached, a reverse movement is initiated and, if necessary, during this reverse travel the surfaces of the mechanism on which unwanted accumulation of particles may have occurred are momentarily contacted with an air jet when the distributing chamber is so positioned that such particles will fall approximately upon a half laid mat thickness and will lie in the interior of the final product. For this purpose switch E23 is mounted adjacent the line of travel of the distributing chamber 8 so as to be closed for a period of time such as a few seconds at the correct interval. As shown in FIGURE 12A switch E23 energizes solenoid operated valves V4 and V5 connected to a suitable air source on the machine to supply air through distribution tubes (not shown) leading to such surfaces as it may be desired to clear of particles. With some raw materials, it may be desirable to use an air blast system to prevent dropping particles accidentally during the return travel of the distributing chamber 8 at points on conveyor 1 where large particles would show either on the lower or the upper surface of the finished panel. The use of this expedient is optional.

Near the top of FIGURE 12A at the right is shown a series of motors M2, M3, M4 and M5 and their operational circuits for securing the proper program sequence. Motor M2 drives the particle feed system for the distributing chamber as shown in FIGURE 2A and is controlled by the contacts of relay $c2$ and additionally provided with a series control safety switch A. Motor M3 drives the distributing chamber 8 along the rails 9 away from the severing means 10 during which movement the mat laying operation is effected. Motor M3 is coupled to the drive system for chamber 8 through a biconical adjustable pulley system for speed selection.

When motor M3 is energized power is supplied to transformer F which feeds a rectifying network supplying D.C. current to an electrically controlled coupling as shown schematically in FIGURE 12A which when energized permits delivery of power from motor M3 and when de-energized renders motor M3 free of the drive system. Motor M4 is employed to secure a fast reverse travel of distributing chamber 8 back to its rest position adjacent severing means 10. During operation of motor M4, therefore, motor M3 is not driven or rotated. Motor M4 operates under control of relay contacts $c4$, which again are in series relation with a safety limit switch $c$.

Switch $c$ ensures de-energization of the drive system for distributing chamber 8 should it overrun switch E8 as will be later described, while in the opposite travel of the distributing chamber 8 switch $b$ backs up the normal operation of limit switch E9 for movement away from the severing means 10. Switch A, as will later appear, operates to start motors M2 for the particle feed system shortly after the distributing chamber has begun to move to the left in FIGURE 1A.

Motor M5, shown at the extreme right in FIGURE 12A, operates to drive the mat supporting conveyor 1 under control of contacts of relay $c5$.

Returning now to motors M3 and M2, and their control circuit energizable by operation of relays $c2$ and $c3$, it will be seen that the power supply for these circuits is derived through a pair of overload contact breakers $c2$ OL and $c$ OL which feed an emergency manual stop switch $b1$. Assuming the mentioned circuitry is conductive power may then be supplied, provided motors M11 through M14 are operating, through the closed appropriate contacts of relays $c14$, $c15$, $c16$ and $c17$ to switch E6. Switch E6 is, of course, closed except when the distributing chamber 8 and its associated apparatus is adjacent the limit of movement to the left in FIGURE 1A. Consequently power is available at switch E7 carried by the press 11 and responsive to the position of the press head 100. When the press is fully open or substantially so, switch E7 is closed and initiates operation of relay $c2$ and $c3$, through contact $c4$ of relay $c4$, which contacts are normally closed. As switch E7 is closed by motion of the press head 100 towards its open position relay $c3$ locks itself in through contacts $c3$ as shown in FIGURE 12A. This initiates operation of motor M3, but series switch A is maintained open during initial travel of the distributing chamber 8 and until it has traveled a short distance such as 18 inches, when switch A is closed and feed of particles is initiated and continued thereafter during the mat laying step.

As noted above the reverse travel of the distributing chamber 8 is effected by motor M4 through its control relay $c4$. It will be noted that the energization of relay $c3$ is dependent through normally closed contacts $c4$ of relay $c4$ so that motors M3 and M4 cannot be simultaneously operated. Reciprocally, relay $c3$ is provided with normally closed contacts $c3$ in series to relay $c4$ so that during the just described mat laying operation, the operation of motor M4 cannot be initiated.

The travel of chamber 8 under power supplied from motor M3 continues until the associated carriage encounters limit switch E6 which is opened at the series contacts energizing relay $c3$ to de-energize motor M3 and the electro-mechanical coupling G. Operation of switch E6 simultaneously closes a contact E6$b$ which initiates a timing operation by a timing control relay $d2$. This relay is important in the energization of relay $c4$ which controls the operation of motor M4 for returning the distributing chamber 8 to its starting position. The circuit to relay $c4$ includes a limit switch A which is opened by the distributing chamber 8 when it is in its rest position and consequently is closed during the portion of the cycle now being described. Operation of points $d2$TC therefore are energized through switch E8 which is normally closed. After the preselected timing period during which the distributing chamber 8 has come almost to a standstill, the points $d2$TC close to energize relay $c4$ through the above discussed contacts of relay $c3$. Relay $c4$ locks itself in an energized condition through contacts $c4$ and these in turn energize motor M4 through the normally closed safety ultimate limit switch $c$.

This last described operation initiates the return travel of the distributing chamber 8 at a higher lineal speed and its travel is continued until it actuates switch E8 to de-energize the described circuitry and motor M4.

Additional manual controls are provided for the circuits of motors M3 and M4, should such manual control become necessary. Thus, manual switch $b1a$ may be pressed by the operator to initiate a passage of the chamber 8 to the left which movement is terminated by its contact with switch E6. Similarly, a movement of the chamber 8 in the opposite direction may be initiated by manual switch $b1b$.

Motor M5 drives the mat supporting conveyor belt under control of its series contacts actuated by relay $c5$. This motor is of conventional construction and includes a positive brake which locks the shaft unless the motor is energized. When the motor is energized, the brake is automatically retracted. The brake is schematically shown at D above motor M5.

In the operation of the machine, the mat conveyor is sequentially operated for fixed indexing between the equidistantly spaced detents. These detents are affixed centrally to the belt, and the belt is stopped with an adjacent pair of detents symmetrically placed on either side of the press, as it is of considerable importance that the press not be lowered on to these detents. This operation is secured by switch E11 which underlies the belt and is operated by engagement with the detents. This operation of switch E11 as the detent engages the switch opens the circuit to motor M5, but the inertia of the moving belt system carries the lug a short distance past switch E11 so that the same again closes. As will appear below, this reclosure does not restart motor M5. Thus, it will be understood that with the conveyor belt in a stationary position, switch E11 is closed. During such a stationary period of the belt, a mat laying operation has been effected by movement of the distribution apparatus from its position adjacent the press to its remote position at which time not only has switch E6 been closed as described above, but switch E9 is substantially simultaneously operated by movement of the chamber 8 into engagement with switch E9. Switch E9 initiates a preliminary condition of the operating circuit of motor M5 to permit a subsequent movement of the belt, since at this point in the cycle a complete mat laying operation has been completed.

Closure of switch E9 applies power received through switch E11 to relay coil $d3$ which locks itself energized on contact points $d3a$ and simultaneously closes contact points $d3b$. This permits energization of belt drive motor M5 by a subsequent closure of switch E10. This switch is positioned on the press and is closed when the upper platen is elevated a material distance above the height of an unpressed mat. As switch E10 is thus closed, power is applied through contacts $d3b$ to the operating coil of relay $c5$ through auxiliary control switches which will be described below, and this relay locks itself in through contacts $c5$. This initiates movement of the conveyor to feed the completed panel therefrom and introduce the subsequent mat section, and during this operating period the press is slightly lowered to open switch E10. The conveyor continues to run until the subsequent adjacent detent engages switch E11 at which point the power circuit is broken to relay coil $d3$ and this relay unlocks itself and simultaneously unlocks and de-energizes relay $c5$ through its auxiliary contacts $d3b$. Thus, when switch E11 recloses shortly thereafter, switches E9 and E10 are both open and the control circuit for motor M5 remains de-energized.

Safety circuits are provided to insure that the conveyor has not laterally deviated from the desired position during operation. These are controlled by limit switches operated by the belt if it deviates from the desired alignment, and each switch comprises two contacts responsive to belt movement first to open one and then the other depending on the amount of lateral deviation. In the circuit as shown, contacts E12$b$ through E15$b$ may be opened by a positional deviation to de-energize relay $d4$. Should this occur, contacts $d4$ (FIGURE 12B) will resume their closed and engaged position to operate horn $h10$ to alarm the attendant who should correct the condition. Should the condition not be promptly corrected, the lateral deviation of the belt may increase and may then open any switch E12$a$ through E15$a$. This circuit interrupts the power which is holding relay $c5$ in an energized condition and therefore this relay drops out. As relay $c5$ drops out it de-energizes motor M5. The attendant then de-energizes the remaining portions of the circuit by operation of manual control switch $b2$.

As shown in FIGURE 12B, there is an additional function carried out during transport of the conveyor belt during closure of contacts of relay $c5$. These contacts energize solenoid operated valves V2 and V3. Valve V3 is connected in a spraying system supply adjacent the left belt pulley and during motion of the belt may be employed to apply thereto a fluid for the purpose of controlling adhesion of the mat and finished product to the belt, and additionally if it is further desired it may apply materials for suplying adhesives or other constituents to the mat.

Similarly, V2 controls a fluid supply for a spray system at the left of the press so that similar constituents or materials may be applied to the upper surface of the mat as it is introduced into the press by movement of the conveyor belt.

Between contact $c5$ and relay coil $c5$, are shown normally closed contacts $d5$, limit responsive switch E16, and an overload relay $c5$ OL. Contacts $d5$ are provided as a safety precaution to ensure that the saw is clear of the mat and in raised position, as will be later described. If, however, relay coil $d5$ (FIGURE 12B) is energized as a result of the saw being in a lowered position, contacts $d5$ are open and prevent operation of belt drive motor M5.

Swith E16 is a safety limit switch on the press, and prevents belt movement if the upper press platen is not in a condition fully clear of the lugs carried by the belt.

The saw mechanism for severing and sampling the mat comprises motors M6, M7, M8 and M9. Motor M6 drives the suction fan and is controlled by contacts of relay $c6$. The band saw is driven by motor M7 under control of contacts of relay $c7$. The saw positioning motor, M8, which raises and lowers the saw for its successive operations is controlled by relay $c8$. In the cyclic operation of this mechanism the suction hood is driven across the mat after the cut is made by the band saw, which operation is effected by a reversable motor M9. Under control of relay $c9$ this motor operates in a first direction while by operation of relay $c10$, the motor reverses and operates to drive the hood in the opposite direction.

An operation of this mechanism is initiated by momentary contact switch E21 which is closed briefly by movement of the particle distribution apparatus shortly after it has initiated a mat forming operation.

As shown in FIGURE 12B the control circuitry associated with the saw mechanism is energized through a manual switch $b3$ which is normally closed except when it is desired to maintain the circuitry completely deactivated. With switch $b3$ engaged, a cycle of operation is initiated by closure of switch E21, which energizes two relays, $c7$ and $c8$, each of which lock in. The series circuit to these relay coils traverses switch E. Relay $c7$ closes its control contacts energizing motor M7 which initiates drive on the band saw. Relay $c8$ through its control contacts initiates operation of motor M8 which lowers the saw to effect a mat severing operation. Switch E is a manual switch which can be depressed to run the saw motor at any desired time, should it be necessary, for instance, to track the saw on its driving drums. In addition to the above referred to operation, the relay $c8$ closes the circuit to relay $c6$ energizing the suction fan drive motor M6. Relay $c6$ locks itself in until subsequently de-energized.

As saw positioning motor M7 lowers the band saw and the associated apparatus, after the cut is completed, the carriage engages and closes switch E17. E17 energizes relay $d5$ which opens its normally closed contacts between switch E and relay $c8$, to stop the operation of the saw positioning motor. It additionally closes a pair of series contacts and circuit to the operating coil of relay $c9$, to energize and lock in this relay. Thus relay $c9$ may only be operated if suction is on the hood because the circuit includes series normally open contacts of relay $c6$. Motor M9 is accordingly energized in the correct direction to advance the suction hood across the mat between the saw cuts to conduct the material to the scale.

When the suction hood has traversed the mat, it engages and closes switch E18 to energize relay $d6$. This opens the normally closed contacts of this relay in the series circuit energizing saw motor M7 through its related control relay $c7$. Relay $d6$ also closes its normally open series contacts in the circuit to relay $d8$, which locks itself in by contacts $c8a$ and additionally energizes relay $c8$ to re-establish operation of the saw positioning motor M8 to raise the saw. Energization of relay $d6$ additionally opens its normally closed contacts $d6a$ to stop traverse of the suction hood by motor M9 under control of relay $c9$.

As the saw rises, its carriage with the associated mechanism momentarily closes switch E19 to stop its motion at the upper limit. The switch E19 momentarily closes when the carriage moves to its upper position but is otherwise open during the rest of the entire cycle of the mechanism. Closure of contacts E19 energizes relay $d7$. This opens the normally closed contacts of $d7$ in the series circuit to relay $d8$ so that $d8$ deenergizes and in turn deenergizes relay $c8$ to stop the positioning motor. Relay $d7$ also closes its normally opened contacts $d7a$ to energize relay $c10$ and start operation of motor M9 in the opposite direction from its former run to return the suction hood to its initial position. Relay $c10$ locks itself in for the duration of this operation. The initial movement of the suction hood permits switch E18 to reopen, deenergize relay $d6$ and reclose the normally closed contacts leading to switch E21 for a subsequent operating cycle.

As the suction hood approaches its final position it momentarily opens switch E20 to deenergize relay $c6$ and the suction fan drive motor M6. The motor M9 itself remains in operation until the suction hood reaches its terminal position where it momentarily opens switch E22 and stops. At this point the apparatus has re-established the initial conditions whose description was begun above, and is ready for a subsequent operation when switch E21 is reclosed by the mat laying apparatus on a subsequent operation.

Motor M10 at the right of FIGURE 12B drives the pressure pump for the press. As shown in the upper portion of the figure, this motor is provided with three starting control relays $c11$, $c12$ and $c13$. The starting operation is manually initiated by depressing starting switch $b5$. This energizes relay $c13$ which closes its series contacts energizing time delay switch $d9$, which begins a timing period subsequent to which it throws its contacts $d9$TC. The closure of the control contacts of relay $c13$ energizes relay $c11$ which locks itself in.

When delay switch $d9$ throws, relay $c13$ is deenergized and power is applied to relay coil $c12$, $c12$ opens its normally closed series contacts to relay $c13$. $c11$ remains locked in and maintains motor M10 in operation. When it is desired to terminate operation of motor M10, the other push button of manual switch $b5$ is depressed to open the circuit to relay $c11$.

It will be understood that the above described apparatus is representative of the preferred embodiment of the invention, the scope of which is defined by the appended claims.

I claim:

1. Apparatus for air laying mats of loose discrete particles suitable for subsequent compressing to form cured panels of predetermined dimension comprising a particle distributing chamber, particle supply means of a length at least equal to the width of a desired panel extending transversely of said distributing chamber to supply particles in proximity to the longitudinal center thereof, means to impel particles toward opposite ends of said distribution chamber embracing means for drawing air in one direction under particle impelling force through passageways spaced transversely of a plenum chamber extending across said distribution chamber at the approximate longitudinal center thereof and means for drawing air in an opposite direction under particle impelling force through passageways spaced transversely of said plenum chamber and offset laterally from said first mentioned passageways.

2. The apparatus of claim 1 characterized in that it embodies means for longitudinally shifting the particle supply means with respect to said passageways.

3. The apparatus of claim 1 characterized in that it embodies means for longitudinally moving said distribution chamber while laying a mat thereunder and means for shifting said supply means with respect to said plenum chamber in timed relation to the longitudinal movement of said distribution chamber.

4. The apparatus of claim 1 characterized in that it embodies means intermediate said plenum chamber and each end of said distribution chamber to prevent large surface particles from reaching areas near the opposite ends of said distribution chamber.

5. The apparatus of claim 1 characterized in that it embodies oscillatable screens intermediate said plenum chamber and each end of said distribution chamber to prevent large surface particles from reaching areas near the opposite ends of said distribution chamber.

6. In an intermittently operated panel board producing installation in which successive mat sections of loose particles are laid on an intermittently advanced mat carrying conveyor a mat severing and sampling instrumentality comprising an elongated frame, a vertical track at each end of said frame, a sub-frame movable on said tracks, a band saw carried on said sub-frame, a sample suction device movable on said sub-frame, a first means for intermittently raising and lowering said sub-frame and means on said sub-frame operating in timed relation to said first means for operating said band saw and for moving said sample suction device.

7. In an intermittently operated panel board producing installation in which successive mat sections of loose particles are laid on an intermittently advanced mat carrying conveyor a mat severing and sampling instrumentality comprising an elongated frame, a vertical track at each end of said frame, a sub-frame movable on said tracks, a band saw carried on said sub-frame, a sample suction device movable on said sub-frame for severing a sample section between parallel runs of said band saw, means for intermittently raising and lowering said sub-frame and means on said sub-frame for operating said band saw for moving said sample suction device in which said last two recited means are actuated in timed relation and during intervals when the mat carrying conveyor is at rest.

8. A method for producing particle board panels from loose discrete particles comprising the steps of laying a mat section on a conveyor during an interval when the conveyor is stationary by traversing a mat lying unit along said conveyor while supplying particles to a plenum chamber therein and impelling particles so supplied in opposite directions by multiple discrete air streams moving in opposite directions in laterally offset paths.

9. The method of claim 8 in which discrete air streams moving in opposite directions are vertically spaced.

References Cited by the Examiner
UNITED STATES PATENTS

| | | | |
|---|---|---|---|
| 1,740,662 | 12/1920 | McCarthy | 156—372 X |
| 2,154,476 | 4/1939 | Simpson et al. | 156—375 X |
| 2,635,301 | 4/1953 | Schubert et al. | 156—375 |
| 2,746,895 | 5/1956 | Duvall | 156—373 |
| 2,923,030 | 2/1960 | Himmelheber et al. | |
| 3,028,287 | 4/1962 | Greten | 19—155 X |
| 3,038,527 | 6/1962 | Greten | 156—373 |
| 3,051,219 | 8/1962 | Kaiser | 156—375 |

EARL M. BERGERT, *Primary Examiner.*

P. R. WYLIE, J. MATHEWS, W. E. HOAG,
*Assistant Examiners.*